June 18, 1940.  L. L. GRETERMAN  2,205,167
SCREW DRIVER
Filed March 8, 1938
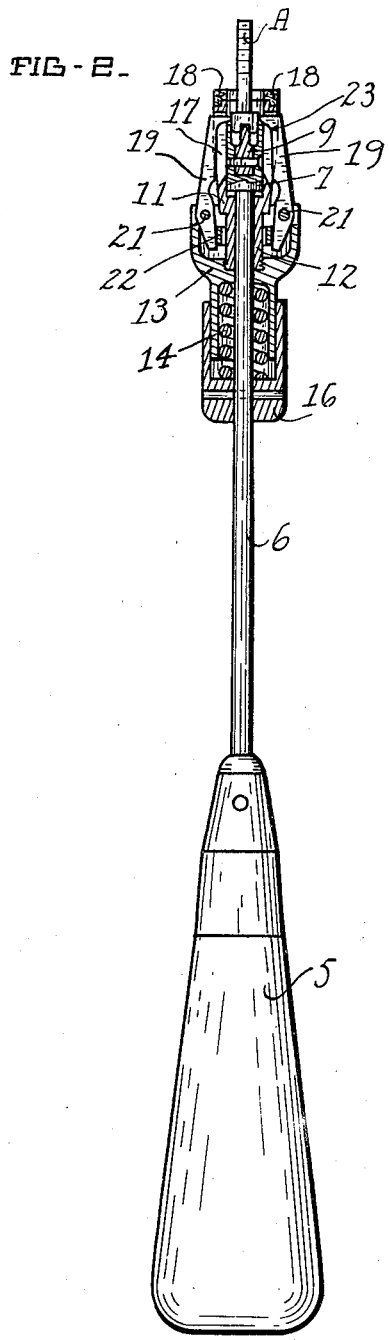
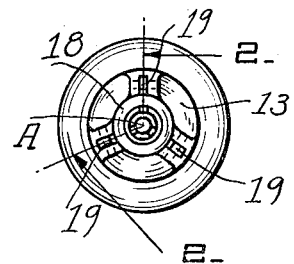
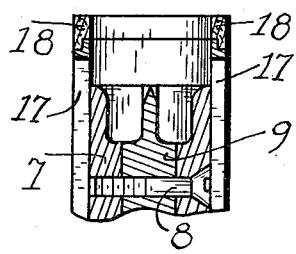
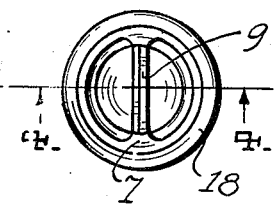
INVENTOR.
LAMBERT L. GRETERMAN.
BY
ATTORNEYS.

Patented June 18, 1940

2,205,167

UNITED STATES PATENT OFFICE 2,205,167

SCREW DRIVER

Lambert L. Greterman, Santa Monica, Calif.

Application March 8, 1938, Serial No. 194,697

1 Claim. (Cl. 145—52)

This invention relates to improvements in screw drivers and has particular reference to a screw driver for engaging the head of a screw and holding the same preparatory to placing the screw in a threaded opening.

A further object is to produce a device of this character which will prevent the marring of a surface into which the screw is being placed by the slippage of the screw driver, as is often the case.

A further object is to produce a device of this character which is simple to manufacture and, therefore, economical to produce.

A further object is to produce a screw driver which may be used by the ordinary mechanic without requiring any particular training.

Other objects and advantages will be apparent during the course of the following description.

In the accompanying drawing forming a part of this specification and in which like numerals are employed to designate like parts throughout the same, Fig. 1 is an end elevation looking from the top of Fig. 2 and on an enlarged scale;

Fig. 2 is a vertical section taken on the line 2—2 of Fig. 1;

Fig. 3 is an enlarged end elevation of the screw engaging bit; and

Fig. 4 is a cross sectional view taken on the line 4—4 of Fig. 3.

In airplane work a great many polished parts are fastened together by small screws, and it has been found that these polished parts are often scratched when applying these screws due to the slippage of the screw driver. Also, there are many places where it is difficult to insert the screws due to the confined area.

I have, therefore, devised a screw driver wherein the screws may be engaged in the screw driver after which the screws are placed against the work and inserted in the threaded openings. At the same time, the screw driver tightly engages the screws so that the same cannot slip therefrom and cause any abrasion upon the adjacent surfaces.

In the accompanying drawing wherein for the purpose of illustration is shown a preferred embodiment of my invention, the numeral 5 designates the handle of the screw driver having a shank 6 provided with a tubular head 7. Within this head 7 is removably secured by a bolt 8 a bit 9. Surrounding the head 7 and slidable thereover is a fitting 11, which fitting has a reduced portion 12 threadedly engaging a head piece 13 slidable on the shank 6. In Fig. 2 it will be noted that there is a spring 14 introduced between the head piece 13 and the ferrule 16 which is secured to the shank 6. The fitting 11 has slots 17 and carries on its free end a fiber washer 18. The slots 17 permit pivoted fingers 19 to move upon their pivots 21 against the tension of a spring ring 22. The fingers 19 are so shaped that cam surfaces 23 co-operate with the end of the head 7 in a manner to be later described.

The result of this construction is that when the operator takes hold of the head piece 13 and moves it toward the handle 5, which may be held against the body or any other support, the movement of the head piece 13 will draw the fingers 19 in such a direction that the cam surfaces 23 will ride upon the head 7, pivoting against the tension of the spring ring 22. A screw A is now inserted so that the slot thereof engages the bit 9, and then the head piece 13 is released. Immediately the fingers 19 will engage the outer surface of the head of the screw, as illustrated in Fig. 2. The screw is now threaded into the opening, and the fiber washer 18 will engage the surface adjacent the screw opening, thus protecting the surface from injury due to scratching by the screw driver.

It will be apparent from the above description that my screw driver will accomplish all the objects set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A screw driver having a handle and a shank, a head carried by the outer end of said shank, a removable bit secured in said head, a sleeve surrounding the head and the outer end of the shank and carrying a soft packing at its outer end, a hand piece slidable on the shank and secured to the inner end of the sleeve and having its outer end spaced from the sleeve, fingers pivoted intermediate their ends to the hand piece between the same and the sleeve, spring means engaging the inner end of the fingers and forcing their outer ends through slots in the sleeve beyond the outer end of the bit, cam faces carried by the outer ends of said fingers, and spring means mounted on the shank between said hand piece and a ferrule fixed to said shank intermediate said hand piece and the handle for normally holding the hand piece outwardly, whereby the inward movement of the hand piece will cause the head to engage the cam faces of the fingers and force them outwardly.

LAMBERT L. GRETERMAN.